(12) United States Patent
Yan

(10) Patent No.: US 10,270,085 B2
(45) Date of Patent: Apr. 23, 2019

(54) SECONDARY BATTERY NEGATIVE ELECTRODE MATERIAL

(71) Applicant: Nanjing Jingyan New Energy Technology Co., Ltd., Nanjing (CN)

(72) Inventor: Jing Yan, Nanjing (CN)

(73) Assignee: Nanjing Jingyan New Energy Technology Co., Ltd., Nanjing (CN)

( * ) Notice: Subject to any disclaimer, the term of this patent is extended or adjusted under 35 U.S.C. 154(b) by 0 days.

(21) Appl. No.: 15/505,154

(22) PCT Filed: Sep. 3, 2015

(86) PCT No.: PCT/CN2015/088921
§ 371 (c)(1),
(2) Date: Feb. 20, 2017

(87) PCT Pub. No.: WO2016/034143
PCT Pub. Date: Mar. 10, 2016

(65) Prior Publication Data
US 2017/0256787 A1    Sep. 7, 2017

(30) Foreign Application Priority Data

Sep. 5, 2014  (CN) .......................... 2014 1 0454140

(51) Int. Cl.
*H01M 4/36*      (2006.01)
*H01M 4/02*      (2006.01)
(Continued)

(52) U.S. Cl.
CPC ............. *H01M 4/36* (2013.01); *C04B 35/522* (2013.01); *C04B 35/532* (2013.01);
(Continued)

(58) Field of Classification Search
CPC combination set(s) only.
See application file for complete search history.

(56) References Cited

U.S. PATENT DOCUMENTS

2014/0065447 A1*  3/2014  Liu .................. H01M 4/131
                                           429/7
2016/0301096 A1*  10/2016 Zhamu ............. H01M 10/054

FOREIGN PATENT DOCUMENTS

CN      102110839 A      6/2011
CN      103094607 A      5/2013
(Continued)

OTHER PUBLICATIONS

Yan, Jing et al., "Rechargeable hybrid aqueous batteries", Journal of Power Sources 2012, vol. 216, pp. 222-226. [Here, only abstract included].
(Continued)

*Primary Examiner* — Jonathan G Leong
*Assistant Examiner* — Christopher P Domone
(74) *Attorney, Agent, or Firm* — Berggren LLP

(57) ABSTRACT

A secondary battery negative electrode material comprises a framework, a chelating/adsorption group and an active substance. The framework does not participate in electrochemical reaction, and only provides a carrier for the chelating/adsorption group (represented by iminodiacetic acid chelating groups in Figure), which contains N, S, P, O atoms having lone pair electrons in outer electrons and has chelating/chemical adsorption bonds formed between it and bivalent/polyvalent metals. The active substance is bivalent/polyvalent metal ion that can be reduced into lower valence states. The active substance metal ion is reduced, during charging, to metal in a lower valence/metal elemental state, which reversely forms, during discharging, the metal ion and has chelating/chemical adsorption bonds formed between it and the chelating/adsorption group. The negative electrode material can form a battery together with positive electrode materials. The battery is expected to be applied to electric (Continued)

vehicles or large-scale energy-storage projects for low price and reliability.

6 Claims, 8 Drawing Sheets

(51) Int. Cl.
  *C04B 35/532* (2006.01)
  *H01M 4/04* (2006.01)
  *C04B 35/628* (2006.01)
  *C04B 35/52* (2006.01)
  *H01M 14/00* (2006.01)

(52) U.S. Cl.
  CPC ..... *C04B 35/62839* (2013.01); *H01M 4/0402* (2013.01); *H01M 4/0407* (2013.01); *H01M 4/366* (2013.01); *H01M 14/00* (2013.01); *C04B 2235/425* (2013.01); *H01M 2004/021* (2013.01); *H01M 2004/027* (2013.01)

(56) References Cited

FOREIGN PATENT DOCUMENTS

| | | |
|---|---|---|
| CN | 104022261 A | 9/2014 |
| CN | 104659342 A | 5/2015 |
| JP | 2006286485 A | 10/2006 |

OTHER PUBLICATIONS

Wu, Li et al., "Rechargeable Lithium Batteries with Aqueous Electrolytes", Science 1994, vol. 264, pp. 1115-1118.

* cited by examiner

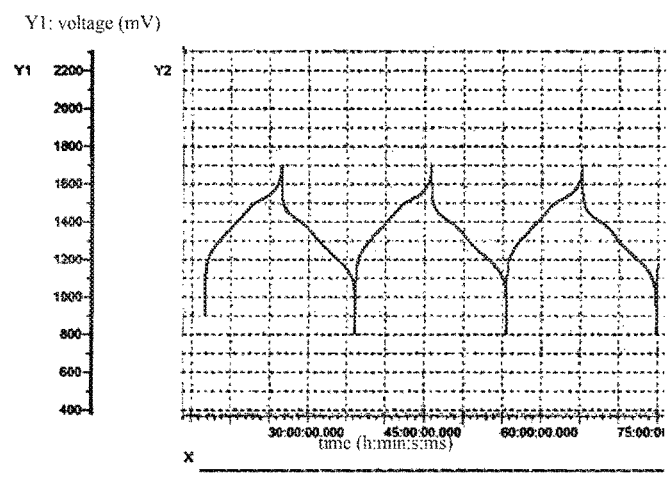
Fig. 10
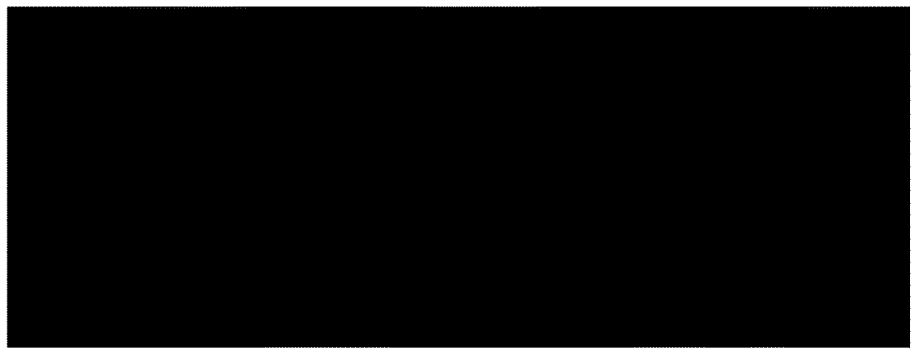

US 10,270,085 B2

SECONDARY BATTERY NEGATIVE ELECTRODE MATERIAL

PRIORITY

This application is a U.S. national application of the international application number PCT/CN2015/088921 filed on Sep. 3, 2015 and claiming priority of the Chinese national application CN 201410454140.6 filed on Sep. 5, 2014, the contents of both of which are incorporated herein by reference.

TECHNICAL FIELD

The present invention relates to the field of electrochemical energy storage, and particularly to a secondary battery negative electrode material.

BACKGROUND ART

The current demand for energy storage technologies is far beyond that at any moment in the human history. No matter whether it relates to new energy vehicles, or wind energy in the future, or solar power station auxiliary facilities, or peak load shifting of the smart grid in cities etc., it all requires an enormous amount of reliable energy storage technologies.

However, speaking of currently commercialized battery technologies, ancient lead acid batteries are mainly referred to, which do great damage to the environment; while newly emerging lithium-ion batteries have achieved great success in the aspect of portable devices, whereas they are limited due to the factors such as price, safety and so on, in the large-scale power or energy storage fields. Thus, it is a very urgent project to develop a safe and inexpensive rechargeable battery.

Wu Li, from the Jeff Dahn Research Group in Canada, published an article on *SCIENCE* in 1994 about the use of $VO_2$ as the negative electrode material, $LiMn_2O_4$ as the positive electrode material, and an aqueous solution as electrolyte, which is a pioneering and groundbreaking technology in the area of aqueous lithium-ion batteries. However, as the problem regarding the stability of the negative electrode material of lithium-intercalated batteries cannot be fundamentally solved over a long period of time, and such batteries still cannot be practically applied even after development in recent 20 years.

In a patent application document 201010154104.X in 2009 and in the *Journal of Power Sources* in 2012 (216 (2012)222-226)), Chinese researcher Jing Yan has reported a battery system (lithium-zinc battery) having $LiMn_2O_4$ as the positive electrode material, an aqueous solution as electrolyte, and the zinc ion in the aqueous solution serving as the active substance of the negative electrode. This system thoroughly solves the problem regarding the stability of the negative electrode of the aqueous lithium-ion battery, whereas the change of the basic mechanism also leads to the result that this battery cannot be called as aqueous lithium-ion battery any more, and thus forms a novel battery system, which is called, for the moment, as YAN-battery. This battery is inevitably confronted with the problem of zinc dendrites due to the use of a traditional $Zn/Zn^{2+}$ electrode, which makes the design of the battery very difficult.

The technology described herein combines the advantages of the aqueous lithium battery with those of the preceding lithium-zinc battery, in which a chelating/adsorption group is used to "fix" metal ions for in-situ reactions (oxidation and reduction) of the negative electrode material.

Viewed from the appearance, if this material is used in combination with such a lithium-intercalated positive electrode of $LiMn_2O_4$ for forming a battery, its macro-behavior and battery design are similar to those of the aqueous lithium-ion battery, while a negative electrode of the chelating/adsorbing type assures the stability of the material, thereby solving the problem of zinc dendrites during charging and discharging processes of a $Zn^{2+}/Zn$ electrode.

The working mechanism of this material is unprecedented and will bring about a revolution in the battery technology.

DISCLOSURE OF THE INVENTION

An object of the present invention is to provide a secondary battery negative electrode material.

The negative electrode material provided in the present invention is based on an unprecedented charging and discharging mechanism. Metal/metal ion electrodes have been widely investigated in the past, for example, metal lithium is used as a negative electrode in an lithium battery, and zinc is used as a negative electrode in a zinc-bromine battery, and so on, and such electrodes have almost unlimited lifetime in theory, whereas due to the problem of dendrites of metals/metal ions during the charging process, such electrodes can hardly be widely applied in the battery industry, although they have very excellent electrochemical performance.

The present invention provides a secondary battery negative electrode material, which can thoroughly overcome the problem of dendrites of metals/metal ions during the charging process.

The technical solution of the present invention is as follows: A secondary battery negative electrode material, being mainly composed of a framework, a chelating/adsorption group and a "fixed" active substance (a bivalent or polyvalent metal ion), wherein the framework is an organic polymer and makes the chelating/adsorption group fixed on the framework through chemical bonds; the chelating/adsorption group is a group containing an atom, such as O, N, P etc., whose outermost electron shell has lone pair electrons; and ionic bonds or coordination bonds can be formed between the chelating/adsorption group and the active substance (bivalent or polyvalent metal ion).

The framework of secondary battery negative electrode material provided in the present invention does not participate in the reaction, but merely serves as a carrier. The chelating/adsorption group is attached to the carrier framework through chemical bonds, and the chelating/adsorption group per se do not participate in the electrochemical oxidation and reduction reaction either, but are attached to the active substance (metal ion) through chelation bonds or chemical adsorption bonds. The metal ion, serving as active substance and being fixed on the chelation groups in the form of chelation or chemical adsorption, can, in situ, obtain electrons and be reduced to a lower valence state or a zerovalent state.

As to the above secondary battery negative electrode material, the organic polymer could be polystyrene, polyvinyl chloride, polymethylacrylic acid, polyacrylic acid, polyethylene or polypropylene.

As to the above secondary battery negative electrode material, the chelating/adsorption group could be an iminodiacetic acid group, a carboxylic acid group or a phosphoramidic acid group.

As to the above secondary battery negative electrode material, the bivalent or polyvalent metal ion, as the active substance, could be metal ion in an aqueous solution, with standard electrochemical potential above −1.2 V.

As to the above secondary battery negative electrode material, the bivalent or polyvalent metal ion, as the active substance, could be transition metal ion such as $Cu^{2+}$, $Fe^{2+}$, $Fe^{3+}$, $Pb^{2+}$, $Zn^{2+}$, $Mn^{2+}$, $Ni^{2+}$ or $V^{3+}$, and the like.

The secondary battery negative electrode material according to the present invention can be paired with a positive electrode material, e.g. a lithium-intercalated compound, such as $LiMn_2O_4$, $LiFePO_4$ and so on, or a sodium ion-deintercalated compound, such as $NaMn_xO_y$ and so on, to form a secondary battery having an excellent performance. Thus, the negative electrode material of the secondary battery according to the present invention has a very far-reaching significance.

BRIEF DESCRIPTION OF THE DRAWINGS

FIG. 10 is charging and discharging curves of a battery in example 4.

DETAILED DESCRIPTION OF THE EMBODIMENTS

Figure 1:
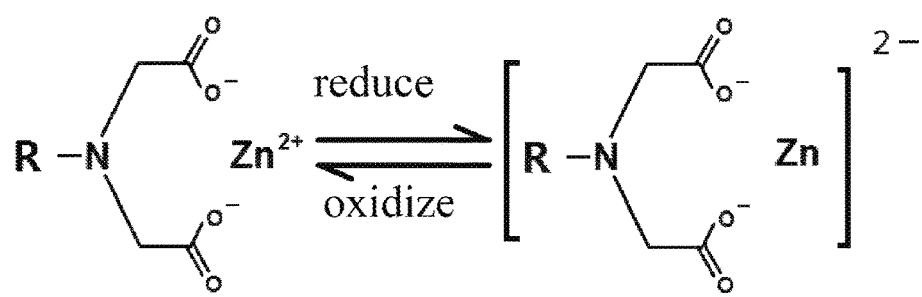
FIG. 1 is a schematic diagram of the basis operation principle of the iminodiacetic acid group-zinc negative electrode material according to the present invention, showing the operation schematic diagram of the charging and discharging processes of a typical framework-iminodiacetic acid chelation group-zinc ionic compound, wherein during the charging process, the chelated zinc ions are reduced into metal zinc. As the negative electrode material according to the present invention can achieve charging and discharging in an aqueous solution, it can also be combined with positive electrode materials of many other types for forming a rechargeable secondary battery.
Figure 2:
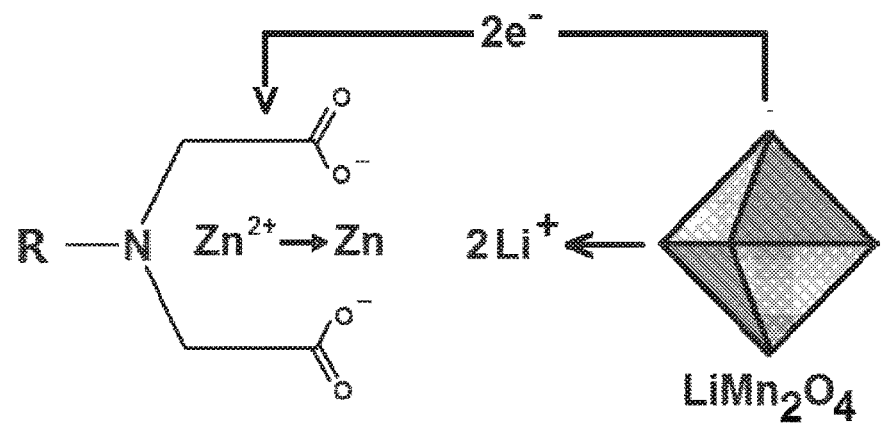
FIG. 2 is a schematic diagram showing the operation principle for charging a battery provided in Example 1 of the present invention.
Figure 3:
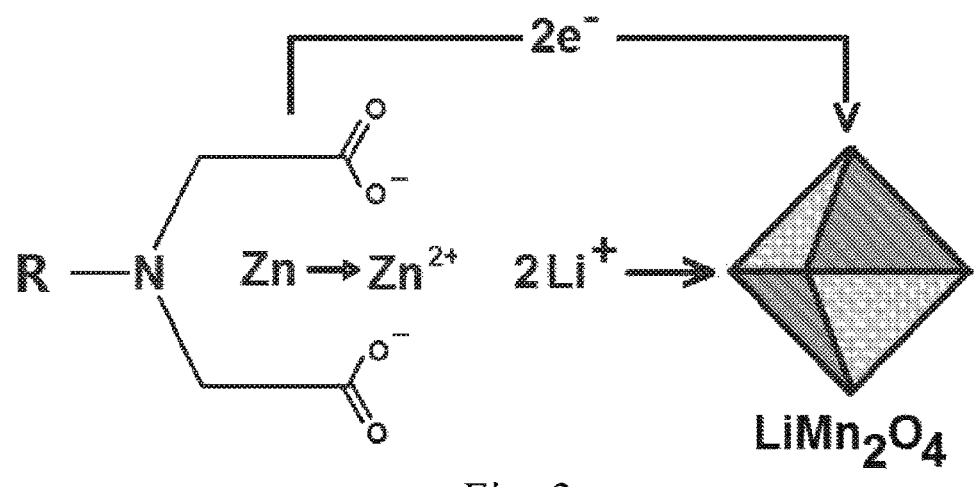
FIG. 3 is a schematic diagram showing the operation principle for discharging the battery provided in Example 1 of the present invention.

As to a negative electrode material according to the present invention, this bivalent or polyvalent metal may obtain electrons and be reduced to lower valence state or metallic state during the charging process (see FIG. 2). During the discharging process (see FIG. 3), which is a reversed process of the charging process, the metal serving as an active substance is converted again into a chelated/adsorbed state.

For example, in a situation where a lithium ion-intercalated compound Li(HOST) is used as the positive electrode material of a battery and $Zn^{2+}$ serves as the metallic active substance as described in the report, the reaction at the positive electrode during the charging is as follows:

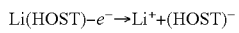

Li(HOST)−$e^-$→$Li^+$+(HOST)$^-$

The reaction at the negative electrode is as follows:

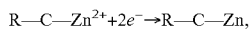

R—C—$Zn^{2+}$+$2e^-$→R—C—Zn, (where R represents the framework, and C represents the chelating/adsorption group).

Taking the $LiMn_2O_4$/R—C—Zn battery for example (see FIG. 4), the battery is formed with $LiMn_2O_4$ as positive electrode active substance and 1 mol/L of $Li_2SO_4$ serving as electrolyte, wherein during charging, the $Li^+$ in $LiMn_2O_4$ is deintercalated from the lattice of a spinel, while trivalent Mn ion in the lattice is oxidized into a tetravalent state, and at the same time an electron is outputted. Due to the deintercalation of lithium ion, $LiMn_2O_4$ is converted into the morphology of $Li_{1-x}Mn_2O_4$, and at the same time, the zinc ion in the chelated state in the R—C—Zn material is reduced by obtaining an electron from an external circuit and deposited in the negative electrode material. During charging, the reaction at the positive electrode is $LiMn_2O_4$−$xe^-$→$Li^+$+$Li_{1-x}Mn_2O_4$, while the reaction at the negative electrode is R—C—$Zn^{2+}$+$2e^-$→R—C—Zn. The discharging process is a reversed process of the charging process, that is, the zero-valent zinc at the negative electrode is oxidized and re-converted into zinc ion in the chelated state, and at the positive electrode, electrons are obtained and intercalated into $Li_{1-x}Mn_2O_4$ along with the lithium ion. It is explained that currently in the Li-battery industry, almost all positive electrode materials are subjected to modification treatment such as doping, coating and the like. For example, $LiMn_2O_4$ cannot represent the general formula of "lithium manganate" which is currently widely used. Strictly speaking, the general formula of this material shall be subject to the general formula of the compound of a spinel structure provided in the present invention. However, as the modification means such as doping, coating, etc. result in complicated expression of the chemical formula of the material, $LiMn_2O_4$ according to the present invention, in the aspect of the technical essence thereof, should broadly comprise positive electrode materials that are subjected to various modifications and have a general formula complying with that of the compound of a spinel structure provided in the present invention. Moreover, as to the chemical formulae of materials such as $LiFePO_4$ according to the present invention, it should also comprise materials that are subjected to various modifications and have a general formula compling with that of a compound of a lamellar structure, a compound of a spinel structure or a compound of an olivine structure.

The main advantages of the present invention consist in that:

1. The negative electrode material provided in the present invention solves the dendrite problem that is difficult to solve when a metal/metal ion electrode is used as the negative electrode of a battery.

2. The negative electrode provided in the present invention is environmentally friendly and cost-saving.

3. Batteries manufactured with the negative electrode material provided in the present invention have an excellent performance.

In the following, the present invention will be further stated with reference to specific examples. It shall be understood that these examples are merely used to describe the present invention, rather than limiting the scope of the present invention. As to experimental methods in the following examples for which no specific conditions are given, they are generally performed according to conventional conditions or conditions suggested by the manufacturers. Unless otherwise specified, all percentages, ratios, proportions or parts are calculated by weight.

Unit of the mass/volume percentage in the present invention would be well known to a person skilled in the art, e.g. it refers to the mass of a solute in 100 ml of a solution.

Unless otherwise defined, all technical and scientific terms used in the description are identical in meanings with that would be familiar to a person skilled in the art. In addition, any methods and materials that are similar or equivalent to those in the disclosed contents can be applied to the method of the present invention. The preferable embodiments according to the description are only intended for demonstration purposes, and Examples 1, 2, 3 and 4 can prove the validity of the theory of the present invention to a person skilled in the art.

EXAMPLE 1

Preparation of a Secondary Battery

1. Preparation of a positive electrode: providing $LiMn_2O_4$ as a positive electrode active substance; and based on a proportion as follows: 90% of positive electrode active substance: 6% of conductive carbon black: 2% of adhesive agent SBR (styrene-butadiene rubber latex): 2% of thickening agent CMC (sodium carboxymethyl cellulose), firstly well mixing CMC with a certain amount of water, then adding the active substance and the conductive carbon black, stirring the same for 2 h, and finally adding SBR and stirring for 10 min, to provide a positive electrode paste. A positive electrode current collector was embodied as an SUS304 stainless steel screen of 150 meshes. The positive electrode paste was uniformly coated on the positive electrode current collector, which was then cut into a size of 10 mm×10 mm, with each having a weight of 50 mg, and dried at 120° C. for 12 h to provide the positive electrode plate.

2. Preparation of a negative electrode active material: placing 1 Kg of a commercially available iminodiacetic acid chelating resin (Purolite S930, which is a chelating resin having a crosslinked polystyrene as a basic framework and an iminodiacetic acid group as an active group and being of a special macroporous structure) into 10 L of 20 wt % sodium hydroxide solution for immersing for 24 h, subsequently washing with deionized water till pH=6-9, drying at 100° C., and grinding the sample with a ball mill for 2 hours, to obtain a precursor of the negative electrode material; and mixing the precursor with a saturated zinc sulfate solution, wherein the mass proportion between the precursor and the zinc sulfate was 1:3, and the pH value was controlled to be between 2 and 6; and mixing and stirring for 3 h, filtering, washing and drying to provide the secondary battery negative electrode material according to the present invention.

3. Preparation of a secondary battery: mixing the negative electrode active substance with tin dioxide, conductive carbon black and zinc powder in a mass ratio of 7:0.5:0.5:2, ball-milling and pressing into a plate shape with a size of 10 mm×10 mm and a weight of 200 mg. The negative electrode current collector of the battery was embodied as a zinc foil with a thickness of 0.05 mm. The electrolyte was an aqueous solution containing lithium sulfate of a concentration of 1 mol/L, and the pH value was adjusted to 4, and the positive electrode plate and the negative electrode plate were assembled to form a battery, and separated by a separating membrane therebetween, wherein the separating membrane was a non-woven separator.

Figure 4:
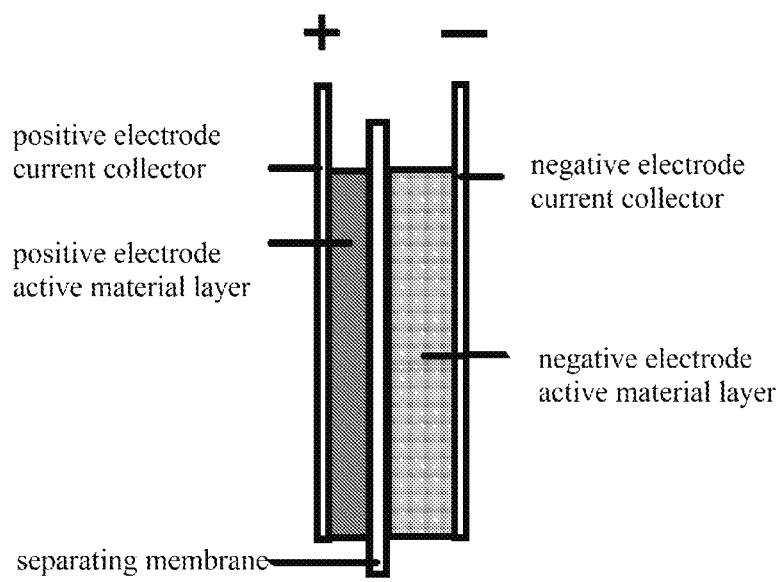
FIG. 4 is a structural diagram of a battery according to an example of the present invention.
Figure 5:
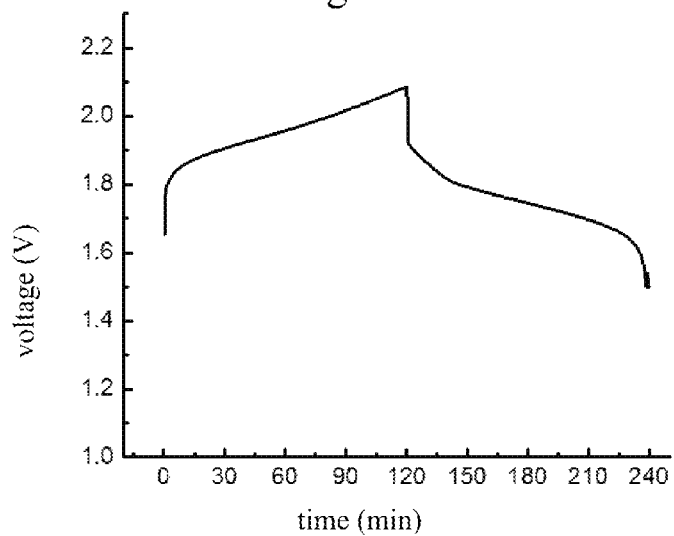
FIG. 5 is a voltage-time curve of a $LiMn_2O_4$/R-iminodiacetic acid group-Zn battery in Example 1 of the present invention during initial charging and discharging.
Figure 6:
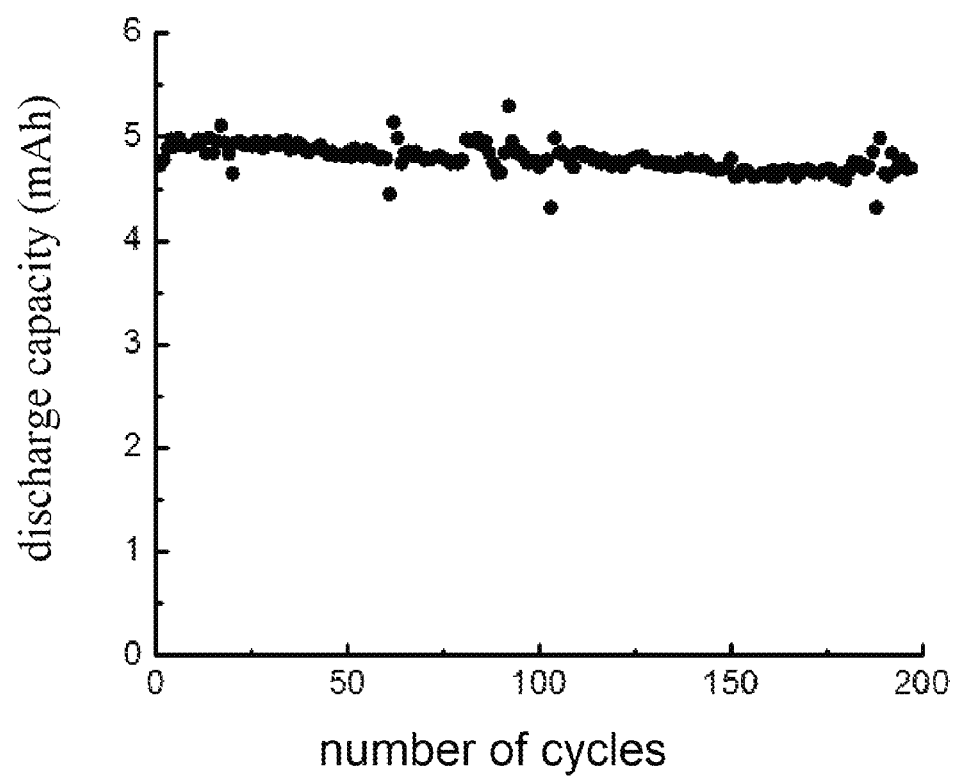
FIG. 6 is a drawing showing the cycle performance of the $LiMn_2O_4$/R-iminodiacetic acid group-Zn battery in Example 1 of the present invention.

The battery had the positive electrode active substance of a weight of about 45 mg, the negative electrode active substance of a weight of about 140 mg, and the theoretical capacity of about 5 mAh. The structure of the battery is shown in FIG. 4. 1 ml of the electrolyte was injected, and the charging and discharging tests could be performed after standing for 12 h. The voltage range for charging and discharging was 1.4-2.1 V. The voltage-time curve of the battery during initial charging and discharging is shown in FIG. 5. The battery exhibited an excellent cycle performance, as shown in FIG. 6.

Considering that chelating resinframeworks from different brands of the same category that also use an iminodiacetic acid group as the active group might be slightly different from each other, in the present example, any synthetic products similar to a material of framework-iminodiacetic acid-zinc shall be deemed as technology equaling the present example.

EXAMPLE 2

The battery was manufactured in the same mode as in Example 1, except that the preparation method of the negative electrode active material was performed as follows:

100 g of sodium polyacrylate (a molecular weight of 10,000) was taken and placed into 1 L of deionized water, 400 g of zinc sulfate was dissolved in 1 L of water, which was subsequently poured into the above mixed solution of sodium polyacrylate and water, and the solution was mixed for 10 h and then washed and filtered. Then the resultant product was mixed with a carbon black conductive agent and a binder PTFE in a mass ratio of 8:1:1, and pressed into an electrode plate, wherein the mass per unit area thereof was the same as that of the positive electrode, and the negative electrode was adhered onto the zinc foil current collector.

The lithium manganate electrode plate in Example 1 was used as the positive electrode of the battery, the areas for the positive electrode and the negative electrode were the same, the mass ratio between the positive electrode and the negative electrode was 1:1, and the electrolyte was a neutral solution of lithium sulfate with pH=7.

Figure 7:
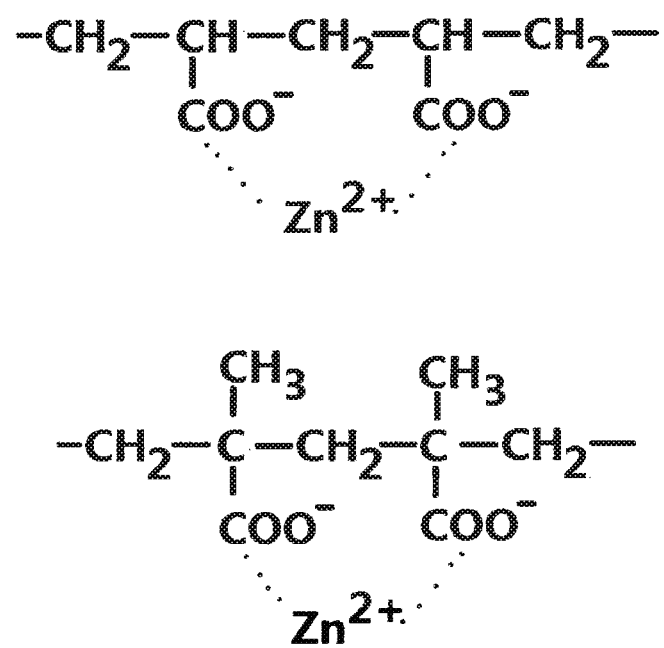
FIG. 7 is a drawing showing the structure of an electrode material according to the present invention, having an acrylic (upper drawing)/a methacrylic (lower drawing) type polymer as the framework, carboxyl group as the chelating/adsorption group, and zinc ion as the active substance metal ion.

The structure of the material prepared by this method is shown in the upper drawing of FIG. 7, wherein the chelating/adsorption group of this material was carboxyl group, ionic bonds were formed between a zinc ion and two carboxyl groups attached to the carrier, thereby fixing the zinc ion, and the charging and discharging performances were similar to those of the material in Example 1, which had an iminodiacetic acid group as the chelation group, while the weight of the negative electrode material was slightly reduced, thereby improving the energy density of the battery.

The charging and discharging curves obtained for the battery are shown in FIG. 10.

EXAMPLE 3

The battery was manufactured in the same mode as in Example 1, except that the preparation method of the negative electrode active material was performed as follows:

100 g of weakly acidic adsorbent resin of a polyacrylic acid type (DIAION WK10, which is a weakly acidic cation exchange resin of a methacrylic acid type, with structure shown in the lower drawing of FIG. 7) was taken and ground to pass through a screen mesh of 400 meshes; 400 g of zinc sulfate was dissolved in 1 L of water, into which the above-mentioned resin powder was poured, and the solution was mixed for 10 h, then washed and filtered. Then the resultant product was mixed with a carbon black conductive agent and an adhesive agent PTFE powder in a mass ratio of 8:1:1, and pressed into a plate-shape and adhered onto the zinc foil current collector.

The lithium manganate electrode plate in Example 1 was used as the positive electrode of the battery, the positive electrode plate and the negative electrode plate were identically sized, the mass ratio of the active substances was 1:1, and the electrolyte was a neutral solution of lithium sulfate with a pH value of 7.

The structure of the material prepared by this method is shown in FIG. 7, wherein the chelating/adsorption group of this material was carboxyl group, ionic bonds were formed between a zinc ion and two carboxyl groups attached to the carrier formed ionic bonds, thereby fixing the zinc ion, and the charging and discharging performances were similar to those of the material in Example 1, which had an iminodiacetic acid group as the chelation group, while the weight of the negative electrode material was slightly reduced.

Figure 8:
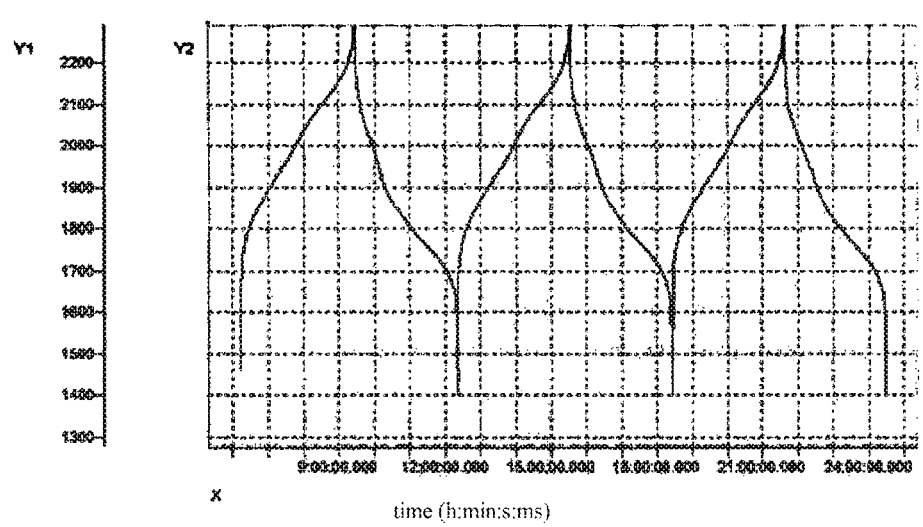
FIG. 8 is a voltage-time curve of a $LiMn_2O_4$/R-carboxyl group-Zn battery in Example 3 during charging and discharging.
Figure 9:
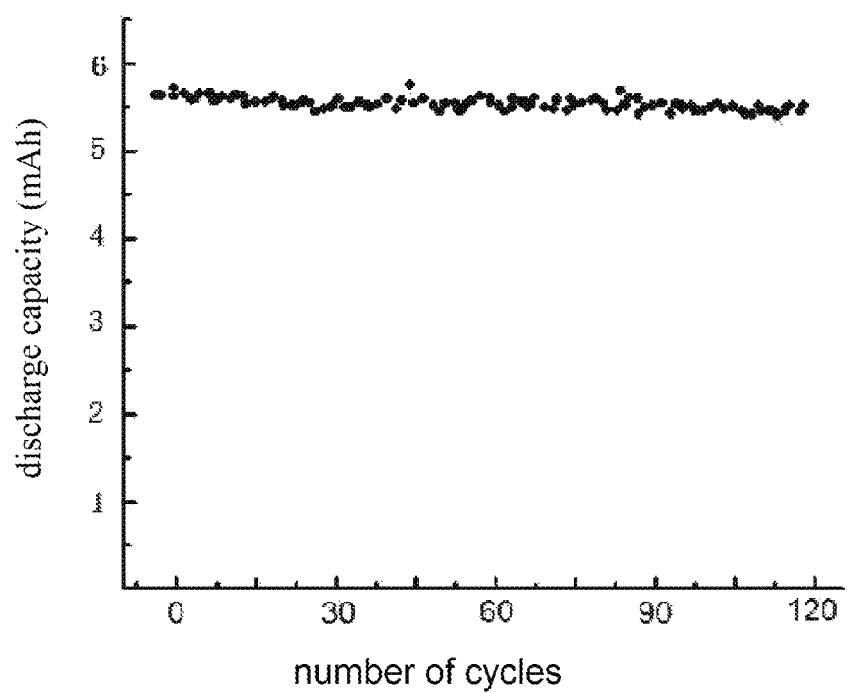
FIG. 9 is a drawing showing the cycle performance of the $LiMn_2O_4$/R-carboxyl group-Zn battery in Example 3.

The charging and discharging curves obtained for the battery is shown in FIG. 8, and the number of cycles-capacity drawing thereof is shown in FIG. 9.

EXAMPLE 4

As to the positive electrode, lithium manganate, conductive carbon black and PTFE were mixed in a mass ratio of 8:1:1, and then pressed into a plate with a size of 60 mm×60 mm and a weight of 3 g. A positive electrode current collector was embodied as a graphite flake of a thickness of 500 microns.

The preparation method of the negative electrode was performed as follows:

100 g of weakly acidic adsorbent resin of a polyacrylic acid type (DIAION WK10, which is a weakly acidic cation exchange resin of a methacrylic acid type, wherein the structural formula of the adsorption group is shown in the lower drawing of FIG. 7) was taken and ground to pass through a screen mesh of 800 meshes; 400 g of lead acetate was dissolved in 1 L of water, into which the resin powder was poured, and the solution was mixed for 10 h, then filtered and washed. Then the resin was mixed with a carbon black conductive agent and PTFE powder in a mass ratio of 6.5:3:0.5, and laminated into an electode plate with a size of 60 mm×60 mm (a thickness of about 0.7 mm) and a weight of 4 g, and was attached to a lead foil of a thickness of 100 µm.

The electrolyte was a 1 mol/L solution of lithium acetate.

The positive electrode plate and the negative electrode plate were separated by a piece of filter paper of 70 mm×70 mm therebetween, and 4 ml of the electrolyte was injected, to provide a battery having a structure as shown in FIG. 4.

The battery was subjected to charging and discharging at a constant current of 50 mA, hereby obtaining charging and discharging curves as shown in FIG. 10, in which the battery exhibited a very good reversibility.

EXAMPLE 5

As to the positive electrode, lithium manganate, conductive carbon black and PTFE were mixed in a mass ratio of 8:1:1, and then pressed into a plate with a size of 60 mm×60 mm and a weight of 3 g. A positive electrode current collector was embodied as a graphite flake of a thickness of 500 microns.

Figure 11:
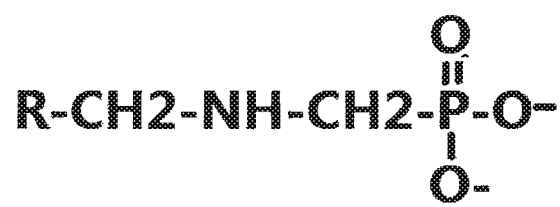
FIG. 11 is a schematic diagram showing a negative electrode in Example 5, wherein zinc is used as an active substance, phosphoramidic acid group is used as a chelating/adsorption group, and the upper drawing shows the state in which a zinc ion is not chelated, and the lower drawing shows the state in which a zinc ion is chelated.
Figure 11:
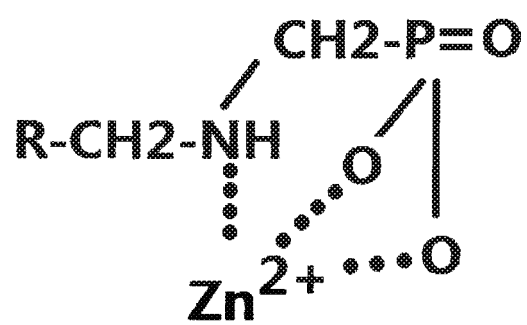

The preparation method of the negative electrode was performed as follows:

100 g of phosphoramidic acid chelating resin (BayerTP260, wherein the structural formula of the adsorption group was shown in FIG. 11, wherein the upper drawing shows a state without $Zn^{2+}$ chelated and the lower drawing shows a stated in which a zinc ion was adsorbed) was taken and ground to pass through a screen mesh of 800 meshes; 400 g of zinc acetate was dissolved in 1 L of water, into which the resin powder was poured, and the solution was mixed for 10 h, then filtered and washed. Then the resin was mixed with a carbon black conductive agent and PTFE powder in a mass ratio of 6.5:3:0.5, and laminated into an electrode plate with a size of 60 mm×60 mm (a thickness of about 0.7 mm) and a weight of 9 g, and was attached to a zinc foil of a thickness of 100 µm.

The electrolyte was a 1 mol/L solution of lithium sulfate.

The positive electrode plate and the negative electrode plate were separated by a piece of filter paper of 70 mm×70 mm therebetween, and 10 ml of the electrolyte was injected, to provide a battery having a structure as shown in FIG. 4.

Figure 12:
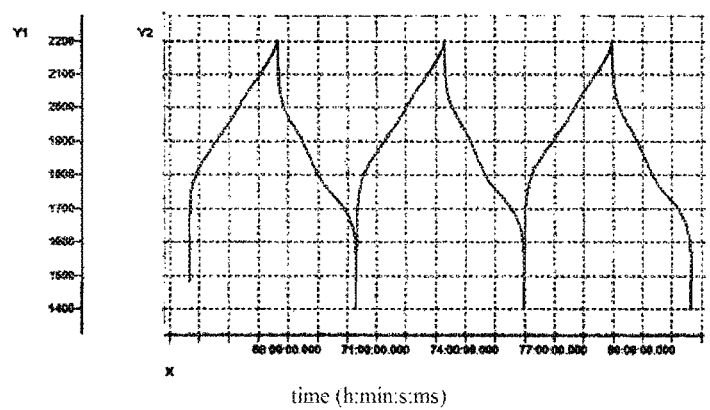
FIG. 12 is a voltage-time curve of a $LiMn_2O_4$/R-phosphoramidic acid group-Zn battery in Example 5 during charging and discharging.

The battery subjected to charging and discharging at a constant current of 50 mA, hereby obtaining charging and discharging curves as shown in FIG. 12, in which the battery exhibited a very good reversibility.

EXAMPLE 6

Preparation of a Secondary Battery

1. Preparation of a positive electrode plate: providing $LiMn_2O_4$ as a positive electrode active substance, and based on a proportion as follows: 90% of positive electrode active substance: 6% of conductive carbon black: 2% of adhesive agent SBR (styrene-butadiene rubber latex): 2% of thickening agent CMC (sodium carboxymethyl cellulose), firstly well mixing CMC with a certain amount of water; then adding the active substance and the conductive carbon black, stirring the same for 2 h, and finally adding SBR and stirring for 10 min, to provide a positive electrode paste. A positive electrode current collector was embodied as an SUS304 stainless steel screen of 150 meshes. The positive electrode paste was homogeneously coated on the positive electrode current collector at a coating density of 500 g/m$^2$, and dried at 120° C. for 12 h to provide the positive electrode plate.

2. Preparation of a negative electrode active material: providing dimethyl formamide (DMF) as a solvent, and making chloromethylated crosslinked polystyrene sphere (chloromethylated sphere) and ammonia aminated at 50° C. for 12 h, wherein the dosage of ammonia was 4 times mass of chlorine contained in chloromethylated crosslinked polystyrene sphere; filtering under a reduced pressure to remove the mother solution after the reaction, and washing the solid product with ethanol; adding one part by weight of the above-mentioned solid content while cooling under a cold water bath and keeping stirring, slowly adding 3 parts by weight of chloroacetic acid; and subsequently, continuously adding a solution of sodium hydroxide to keep the pH value of the solution was kept above 10. The reaction temperature was lower than 70° C. and the reaction lasted for 20 h. After reaction was completed, the solid content was filtered out, and washed and dried for subsequent use. The dried reactant was immerged in an aqueous solution of 20% sodium hydroxide for 5 h, filtered and washed till neutral, to provide a precursor of the negative electrode material.

The precursor was mixed with a saturated solution of zinc sulfate, wherein the mass proportion between the precursor and the zinc sulfate was 1:3, the mixing and stirring lasted for 3 h; and filtered, washed and dried to obtain the secondary battery negative electrode material according to the present invention.

3. Preparation of a secondary battery: mixing the negative electrode active substance with tin dioxide, conductive carbon black and zinc powders in a proportion of 7:0.5:0.5:2, ball-milling, adding deionized water at a certain ratio to form black slurry, which was then coated onto the negative electrode current collector of the battery with a coating density of 1,200 g/m². The negative electrode current collector of the battery was embodied as tin plated copper foil, wherein the copper foil had a thickness of 0.02 mm, the tin plated layer had a thickness of 0.005 mm-0.01 mm. The electrolyte was an aqueous solution containing lithium sulfate of a concentration of 1 mol/L, the pH value was adjusted to 4, and the positive electrode plate and the negative electrode plate were assembled to form the battery, and separated by a separating membrane therebetween, wherein the separating membrane was a non-woven separating membrane The batter had the positive electrode active substance of a weight of about 50 mg, the negative electrode active substance of a weight of about 150 mg, and the theoretical capacity of about 5 mAh. The structure of the battery is shown in FIG. 4. The electrolyte was injected, and the charging and discharging tests could be performed after standing for 12 h. The voltage range for charging and discharging was 1.4-2.1 V. The voltage-time curve of the battery during initial charging and discharging is shown in FIG. 5 of example 1. The battery exhibited an excellent cycle performance, as shown in FIG. 6 of Example 1.

Thus, it can be seen that the negative electrode material according to the present invention represents a type of composition materials, rather than a single kind of materials. Although the materials, obtained through cooperation of different frameworks and chelation/adsorption functional groups, are different in microstructure, the principles thereof and the discharging performances of the batteries are similar, and accordingly, simple replacement of the framework or chelating/adsorption group or obvious modification made to the chelation groups of Examples 1, 3 and 4 all fall within the scope of the present invention.

The invention claimed is:

1. A secondary battery negative electrode material, comprising: a framework; a chelating/adsorption group; and a fixed bivalent or polyvalent metal ion as an active substance, wherein the framework is an organic polymer and makes the chelating/adsorption group fixed on the framework through chemical bonds, the chelating/adsorption group is a group containing an O, N or P atom whose outermost electron shell has lone pair electrons, and ionic bonds or coordination bonds are formed between the bivalent or polyvalent metal on as the active substance and the chelating/adsorption group.

2. The secondary battery negative electrode material according to claim 1, wherein the organic polymer is selected from the group consisting of polystyrene, polyvinyl chloride, polymethylacrylic acid, polyacrylic acid, polyethylene and polypropylene.

3. The secondary battery negative electrode material according to claim 1, wherein the chelating/adsorption group is selected from the group consisting of an iminodiacetic acid group, a carboxylic acid group and a phosphoramidic acid group.

4. The secondary battery negative electrode material according to claim 1, wherein the bivalent or polyvalent metal ion as the active substance is a metal ion in an aqueous solution, with standard electrochemical potential above −1.2 V.

5. The secondary battery negative electrode material according to claim 4, wherein the bivalent or polyvalent metal ion as the active substance is a transition metal ion selected from the group consisting of $Cu^{2+}$, $Fe^{2+}$, $Fe^{3+}$, $Pb^{2+}$, $Zn^{2+}$, $Mn^{2+}$, $Ni^{2+}$ and $V^{3+}$.

6. A method to prepare a secondary battery, said method comprising:
providing a framework;
providing a chelating/adsorption group, wherein the chelating/adsorption group is a group containing an O, N or P atom whose outermost electron shell has lone pair electrons; and providing a fixed bivalent or polyvalent metal ion as an active substance, wherein the framework is an organic polymer and makes the chelating/adsorption group fixed on the framework through chemical bonds, and ionic bonds or coordination bonds are formed between the bivalent or polyvalent metal on as the active substance and the chelating/adsorption group.

* * * * *